June 30, 1953  E. A. DALEY ET AL  2,643,792
LIQUID DISPENSING DEVICE
Filed Oct. 21, 1946  5 Sheets-Sheet 3

INVENTORS:
EDWARD A. DALEY,
HENRY J. MUELLER,
BENJAMIN F. BRACY,
By Kingsland, Rogers & Ezell
ATTORNEYS.

June 30, 1953    E. A. DALEY ET AL    2,643,792
LIQUID DISPENSING DEVICE

Filed Oct. 21, 1946    5 Sheets-Sheet 5

INVENTORS:
EDWARD A. DALEY,
HENRY J. MUELLER,
BENJAMIN F. BRACY,
BY Kingsland, Rogers & Ezell
ATTORNEYS.

Patented June 30, 1953

2,643,792

UNITED STATES PATENT OFFICE 2,643,792

LIQUID DISPENSING DEVICE

Edward A. Daley, Belleville, Ill., Henry J. Mueller, St. Louis, Mo., and Benjamin F. Bracy, Belleville, Ill.

Application October 21, 1946, Serial No. 704,766

16 Claims. (Cl. 222—14)

This invention relates to a liquid dispensing device. In particular, it has to do with a liquid dispensing device by which predetermined amounts of liquid may be dispensed, which predetermined amounts may be measured in terms of two different sets of units.

It is an object of the invention to provide such a dispenser or related device wherein the dispensing by two different sets of units may be operated off of a single switchboard or like preset mechanism. Specifically, it is an object of the invention to provide a dispensing device that will dispense liquid in units of either volume or price, that is to say, in connection with gasoline pumps, it will dispense in units of either gallons or money, and in particular will do so off of a single switchboard.

It is a further object of the invention to provide a mechanism of this kind that will clear the switchboard when the dispenser is rendered inoperative in conventional manner.

A further object of the invention is to provide for the clearing of the limiting means for the dispenser at the same time the calculating means is cleared.

It has heretofore been conventional to provide liquid dispensing pumps with indicators that indicate the amount dispensed, both in units of volume, such as gallons, and in units of money, such as dollars and cents. It has also been conventional to provide a clearing mechanism for the indicators, so that they may be returned to zero indications when a dispensing operation is completed or a new one is to be started. The present invention adapts these mechanisms to its objectives.

Therefore, in particular, it is an object of the invention to provide a single switchboard or other limiting means that may be graduated both in units of money and in units of liquid volume, together with electrical control means that will cause the device controlled by the limiting means to operate until it has dispensed the amount of liquid indicated by the switchboard in either of its units, and then will stop. And a further particular object is to provide for the clearing of this switchboard mechanism and its electrical parts at the same time the indicators are cleared.

In this description, particular reference is made to liquid dispensing mechanism, wherein this invention has especial applicability. It will be understood, however, that features of the invention are more generally useful than in this one combination.

This mechanism is shown as built from a base 25, permanently secured to and enclosed by a conventional pump housing or casing, generally indicated at 24, and which may contain suitable pumping mechanism and driving mechanism, including an electric motor. Two side frames 26 and 27 are bolted to the base 25 and are upstanding therefrom. They are rigidly connected together and held in properly spaced relationship by a plurality of cross members 28, 29 and 30, the last being a flat bar type reenforcement shelf across the top of the frame. As shown, these frame members include vertical columns at their middle parts, and upper and lower outwardly extending arms.

Suitable drive from the motor is brought up between the frames to drive two main shafts 32 and 33 that extend across between the two middle columns of the frame members 26 and 27. Each of the two power shafts operates a set of indicating drums.

The lower shaft 32 is conventionally geared to the driving means by a slip friction clutch (not shown). The indicating drums, operated from the lower shaft 32, are mounted on two opposite outer drum shafts, one indicated at 35 and the other (not shown) being at the opposite ends of the apparatus. These shafts are of identical construction. The shaft 35 has gallon counting drums 37, 38 and 39 thereon. The drum 37 indicates tenths of a gallon, the drum 38 indicates gallons, and the drum 39 indicates tens of gallons.

The drum 37 is rotatable on the shaft 35, and is geared to the shaft 32. A gear train 42, just inside tht side frame 27, drives the drum 37 on the shaft 35.

When the shaft 32 rotates, it causes rotation of the drum 37 on the shaft 35. Above and inwardly of the drums, there is a tally shaft 42 journaled in the frames 26 and 27. This tally shaft idly carries a pick-up gear 43. In conventional manner, the pick-up gear is displaced one tooth by a single lug on the drum 37, each time the drum makes a revolution. The tally gear 43 is meshed with a drum gear 44 fixed to the gallons drum 38. This gallons drum is thus advanced one-tenth of a revolution for each revolution of the tenths drum 37. In like manner, the gallons drum 38 operates another tally gear (not shown) idly mounted on the shaft 42, and enmeshed with a gear 46 on the tens drum 39.

In like manner, the upper drive shaft 33, through suitable gearing, rotates two sets of money drums. On opposite upper arms of the frames, there are two shafts. As the opposite ends of the machine are alike, only one such shaft is shown, at 45. The shaft 45 carries drums indicating money in cents, tens of cents, and dollars, there being a units drum 47, a tens drum 48 and a hundreds drum 49. A gear train 50 just inside the frame 27 connects the shaft 33 with the drum 47 on the shaft 45, and a gear train 51 just inside the frame 26 connects the shaft 33 with the drums (not shown) at the opposite end.

As in the previous case, there is a tally shaft 52 between the side frames. An idling tally gear 53 on the tally shaft is moved one tooth for each revolution of the cents drum 47, and meshes with a gear 54 fixed to the tens drum 48. Another tally gear, not shown, similarly advances the dollars drum 49.

The operation of the foregoing drums need not be further described because it is conventional. The two shafts 32 and 33 operate together, and cause simultaneous rotation of the four sets of drums to indicate the amount of liquid dispensed and the charge therefor.

When it is desired to zeroize the various drums, a zeroizing shaft 56 may be rotated. This shaft is journaled in the two side frames 26 and 27, and receives a crank handle 57. Outside the frame 27, it has mounted on it a gear 58. This gear meshes with two gears 59 and 60 that are united with gears 61 and 62, respectively. The gears 59 and 61 are rotatably mounted on the projection of the shaft 32 outside the frame 27. In like manner, the gears 60 and 62 rotate on the projecting end of the shaft 33.

The gear 61 meshes with two idler gears 65 and 66 on opposite sides of it and mounted on the frame 27. The gear 65 meshes with a zeroizing gear 67 on the shaft 35. The gear 66 meshes with a corresponding gear on the other shaft.

The gear 62 meshes with two idler gears 69 and 70 on opposite sides of it and mounted on the frame 27. The gear 69 meshes with a zeroizing gear 71 on the shaft 45. The gear 70 likewise meshes with a similar gear on the other shaft 45 at the opposite side (not shown). The gears 67 and 71 are fixed to the shafts 35 and 45. Their counterparts are likewise fixed to the similar shafts.

When the shaft 56 is rotated by the crank 57, the zeroizing gears 67 and 71 will be rotated. These are connected with the drums in such wise as to cause the drums to be returned to neutral position. This rotation does not affect the totalizing gearing.

The end of the shaft 56 on the outside of the frame 26 carries a cam disc 75 (Fig. 10) having a notch 76 in the periphery thereof. A bell crank 77 is rockable on the projecting end of the power shaft 33. It has a lug 78 that engages within the notch 76 when the cam 75 is in its starting position. The other end of the bell crank arm is engaged by a tension spring 79 that is fastened to the framework of the machine and causes the bell crank to be urged in the direction to keep the lug 78 against the periphery of the cam 75. It will be seen that the back surface of the lug 78 is curved so that, when the disc 75 is turned upon rotation of the shaft 56, the lug will be forced out of the notch 76 onto the periphery of the cam disc. This action imparts a counterclockwise rocking movement to the bell crank 77 as it appears in Fig. 10.

Each of the sets of drums has a shield on it which is moved to concealing position when the zeroizing mechanism is operated. There is a shield 82 that is U-shaped so as to have arms pivotally supported upon the shaft 35 outside of the two frame members 26 and 27. This shield has a plurality of fingers 83 that project over the surfaces of the several drums, and which, when the shield 82 is rocked counterclockwise as shown in Fig. 10, will extend over the openings in the casing to conceal the numbers.

Figure 10:
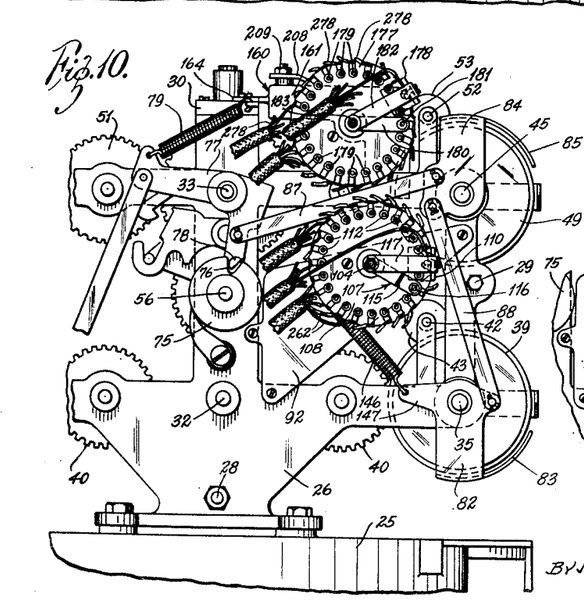
Fig. 10 is a side elevation with the cover removed, taken from the left side of Fig. 9.

As shown also in Fig. 10, there is a shield 84 mounted on the shaft 45, and it has fingers 85 that conceal the drums on this shaft. There are similar shields for the shafts 35 and 45 on the opposite side of the mechanism.

A link 87 is pivotally connected to one arm of the bell crank 77 and pivotally connected to the shield 84 in an eccentric manner, as shown in Fig. 10. Another link 88 connects eccentrically with the shield 84 and with the shield 82. Thus it may be seen that, when the bell crank arm 77 is rocked counterclockwise, the link 87 will be thrust to the right in Fig. 10 and will cause the shield 84 to rock clockwise to bring its fingers 85 down over the openings in the casing, thereby concealing the numbers. At the same time, the link 88 will be drawn upwardly and will pull the shield 82 upwardly, rocking it counterclockwise about the shaft 35, so as to bring its fingers 83 up to conceal the numbers.

The foregoing mechanism is conventional in the art. However, it is employed to perform additional functions in connection with the present invention.

Figure 16:
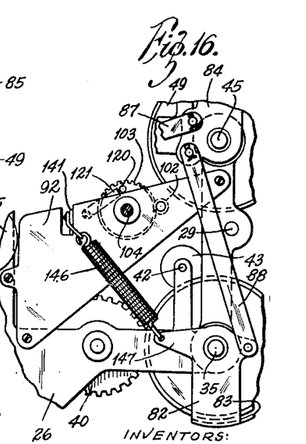
Fig. 16 is a view of a portion of Fig. 10, but with certain electrical mechanism removed therefrom.

As shown in Figs. 10 and 16, there is a bracket plate 92 attached to one side of the frame 26. This bracket has a cross arm 93 (Fig. 17), that may be integrally formed therewith, which extends across to the frame 27 and out through the same to provide a U-shaped bracket 94 that is secured to the frame 26 at its free end by the attachment means for the spacing rod 29.

A shaft 95 is supported in bearings in the plate 92 and in this bracket 94. The bracket 94 and the shaft 95 are stabilized by a brace 96 (Figs. 11, 12) extending upwardly to the idler shaft for the gear 69.

The shaft 95 receives a gear 97 that is slidable along the shaft 95 but is keyed thereto at 98. This gear 97 is selectively engageable with the tally gear 43 mounted on the cross shaft 42. Thus the gear 97 may rotate with and be driven by the tally gear 43, to advance one tooth for every tenth gallon.

The shaft 95 has a small gear 102 thereon that is adapted to mesh with a gear 103. The gear 103, in turn, is non-rotatably mounted upon a shaft 104 that extends between the bracket 92 and another bracket 105 that is formed as an upstanding projection on the cross member 93 that is a part of the bracket 92.

The shaft 104 carries a wiper arm unit 107 outside of the bracket 92. This wiper arm is concentrically mounted with an insulated disc 108 that is supported by a bracket 110 attached to the plate 92. The disc 108 has a plurality of peripherally but electrically insulated contact buttons 112 that project from its outer face. As shown in Fig. 10, each of these contacts has an individual wire connection leading to it.

The contact arm 107 may be made initially of insulative material. However, as will appear more clearly in connection with another wiper arm later to be described, the arm unit 107 contains a spring 115 that is of conductive material, which spring leads to the end of the arm and is connected thereto through a wiper screw 116. The spring arm 115 is in contact at its center with a conductor spring 117 that is connected to the bracket 110 and carries its own lead for electrical connections. The wiper contact is such as to close with the contacts 112, and to make with an adjacent contact before it breaks with a preceding one.

In order to permit free rotation of the wiper arm 107 in a forward direction, but to insure that it will always stop at its zero position when zeroized, a stop means is provided in the form of a lug 120 projecting from one face of the gear 103 and a leaf spring 121 engageable therewith (Fig. 16). The gear 103 is on the same shaft as the wiper arm. The spring 121 is attached at one end to the bracket plate 92. When the gear 103 rotates forward, the leaf spring may yield over the lug. When the gear is reversed, the end of the leaf spring normally bearing yieldably against the face of the gear 103 will be engaged by the lug, and further backward rotation of the gear 103 is stopped. In this position of the gear, the wiper arm will be in starting or zero position.

Figures 11, 12, 14, 15:
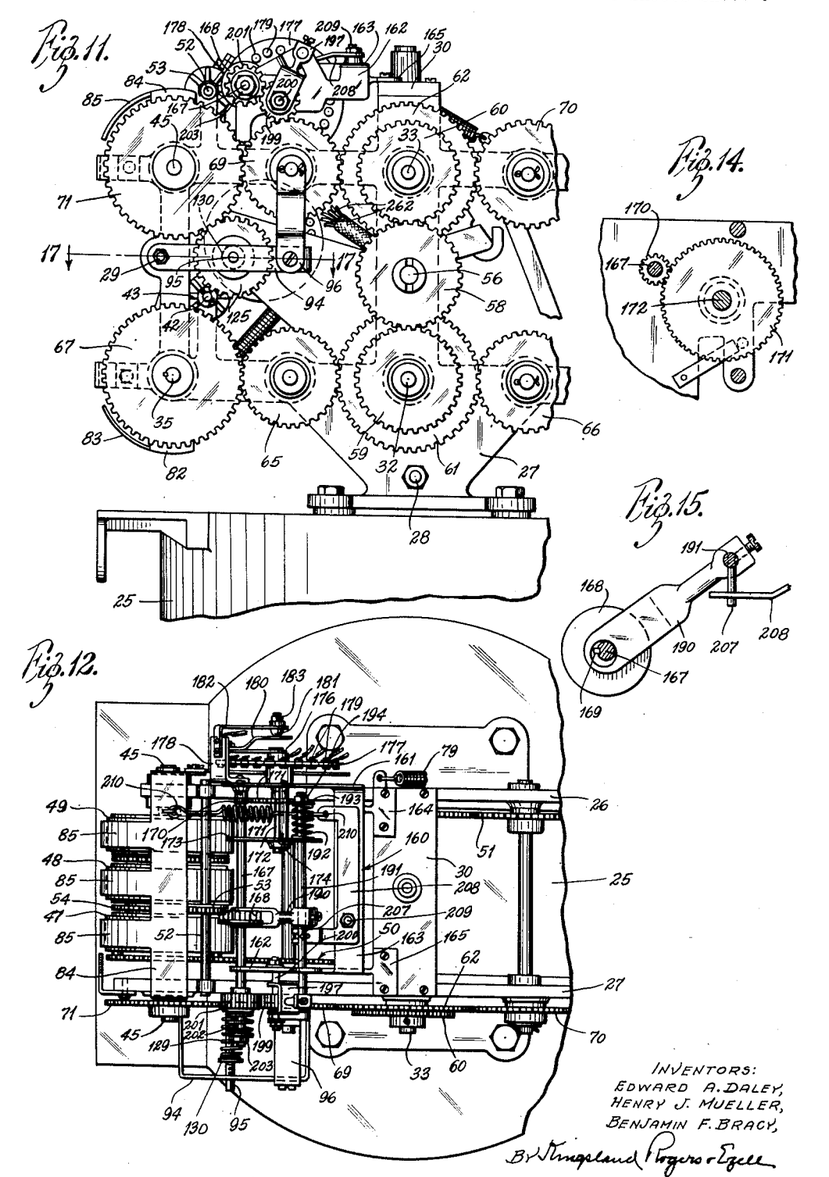
Fig. 11 is a side elevation taken from the right side of Fig. 9.
Fig. 12 is a plan view partly broken away of the mechanism of Figs. 10 and 11.
Fig. 14 is a section on the line 14—14 across the top middle of Fig. 13.
Fig. 15 is a section on the line 15—15 across the lower middle of Fig. 13, and showing one of the clutch release arms.
Figures 17, 18:
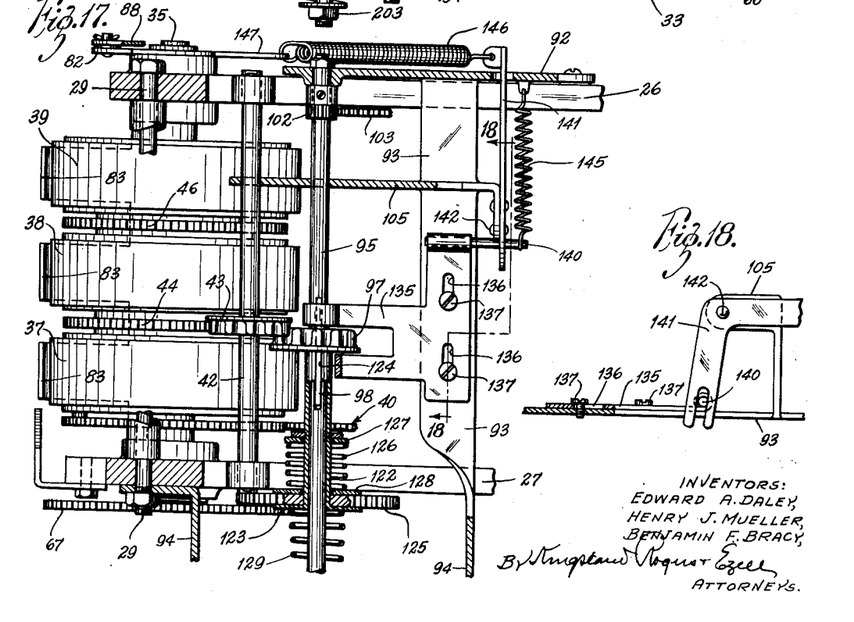
Fig. 17 is a horizontal section on the line 17—17 across the left middle of Fig. 11, showing the lower clutch mechanism.
Fig. 18 is a section on the line 18—18 extending up and down at the right side of Fig. 17.

Returning to Fig. 17 and Fig. 11, it will be seen that the shaft 95, which drives the wiper arm, has a sleeve 122 with an outer flange 123, and an inner slot 124 that engages over the key 98 to hold the sleeve non-rotatably but slidably onto the shaft. The sleeve 122 receives a gear 125 urged against the flange 123 by a spring 126 that is held at its other end by a removable washer arrangement 127. The gear may have a washer 128 on its inner face to receive the spring. The foregoing assembly is urged inward by a spring 129 on the shaft 95 and acting between the flange 123 and a washer arrangement 130, as shown in Figs. 12 and 17. By the foregoing arrangement, the gear 125, which may be meshed with the zeroizing gear 71 and driven thereby, is frictionally connected with the shaft 95. Also the gear unit is normally urged inward by the spring 129, but may be moved outwardly along the shaft, the latter not withdrawing the slot 124 from the key 98 in normal operation.

The gear wheel 97 is flanked by a shifter fork 135 which has a head that is slotted at 136, and which rides over the cross bar 93. Screws 137 pass through the slots into the cross bar 93 to secure the shifter fork onto the cross bar and to limit its movement to the sliding movement indicated.

The shifter fork has a pin 140 projecting outwardly from it. This pin is received in a slotted end of a crank arm 141 (Figs. 17, 18) that is pivoted at 142 to the upstanding flange 145 formed as part of the bracket 93.

The other end of the crank arm 141 extends out through a suitable opening in the plate 92 and has an end to which a coil spring 146 is attached. As shown in Fig. 16, the spring 146 is secured at its other end to an arm 147 projecting outwardly from the shield 82. This spring is unloaded or substantially unloaded when the arm 147 is in its released position. The coil spring 145, extending from the bracket 92 to the pin 140, normally urges the clutch fork 135 toward the side frame 26 to maintain the gear 97 in mesh with the gear 43. When the crank 57 is operated, so that the shield 82 rocks counterclockwise as shown in Fig. 10, the spring 146 will be tensioned, and it will then pull the arm 141 downward, which causes its other end to rock the pin 140 toward the other side frame 26. This unmeshes the gear 97 from the tally gear 43. The engagement of the gear 97 with the sleeve 122 causes the gear 125 to be shifted outwardly into mesh with the return gear 71, as shown in Fig. 11. Then, when the return gear 71 is rotated by the zeroizing mechanism, the gear 125 will be correspondingly rotated and the shaft 95 will be rotated. The gear is such that this will cause a return of the shaft 95 the same amount it was advanced by the gears 43 and 97. The return of the shaft 95 through the gear 103 will cause the wiper arm 107 to return to its starting position in which it is in contact with a particularly chosen contact point 112.

A bracket member (Fig. 13), generally designated at 160, has side frames 161 and 162 connected by a connecting member 163. This connecting member has projections 164 and 165 that are securely attached to the cross bar 30 at the top of the two frames.

The bracket 160 supports a shaft 167 that extends across the top of the machine. This shaft has a gear 168 that is normally in mesh with the tally gear 53. The gear 168 is keyed to the shaft 167, as shown at 169, so that it may slide along the shaft but will always rotate the shaft.

The shaft 167 carries a small gear 170 that is in mesh with a gear 171 mounted on the shaft 172. The shaft 172 is carried between the side member 161 of the bracket 160 and a spaced plate 173 that is fixed by rigid spacers 174 to the side member 161.

The shaft 172, at its outer end (Figs. 10 and 12) carries a wiper arm 176 which revolves around an insulated disc 177 that is supported non-rotatably on the shaft and upon a bracket 178 that is attached to the plate 160. The disc 177 has individually connected contact points 179 arranged around its periphery. The contact at the outer end of the wiper arm 176 is selectively engageable with any one of these contact points 179.

The wiper arm 176 is of insulative material. At its outer contact end, it is attached to a conducting spring 180 that is radially disposed with respect to the wiper arm. Its inner end is sprung outwardly therefrom into contact with a circuit maker point 181 that is supported upon a bracket 182 mounted upon the bracket 178. This contact point 181 is thereby caused to receive its proper electrical lead, it being shown as having a nut 183 for this purpose. This wiper arrangement is the same as the one previously described as far as its mechanics are concerned.

The gear 168 is straddled by a shifter fork 190 that is adjustably attached by a setscrew along a cross shaft 191, which bears in the plate 173 and in the plate 162 on the bracket 160 (see Fig. 15). The shaft 191 is encircled by a compression spring 192 that engages against the bracket 173 and a washer 193 confined by a nut 194. By this means, the shaft 191 is urged toward the side frame 26, which is upwardly in Fig. 13. This spring thereby urges the fork 190 to bring the gear 168 into engagement with the gear 53.

The shaft 191 likewise carries another shifter fork 197 that is held adjustably by a setscrew to the shaft 191. This shifter fork straddles a gear 199 on a cross shaft 200 that projects outwardly from the side of the bracket 162. The gear 199 is in mesh in Fig. 13 with a gear 201 on the shaft 167. This gear is rotatably mounted on the shaft, but is normally caused to rotate the shaft by friction, as it is urged by a spring 202 confined between a nut 203 on the shaft and a collar 204 fixed to the shaft 167.

Figure 13:
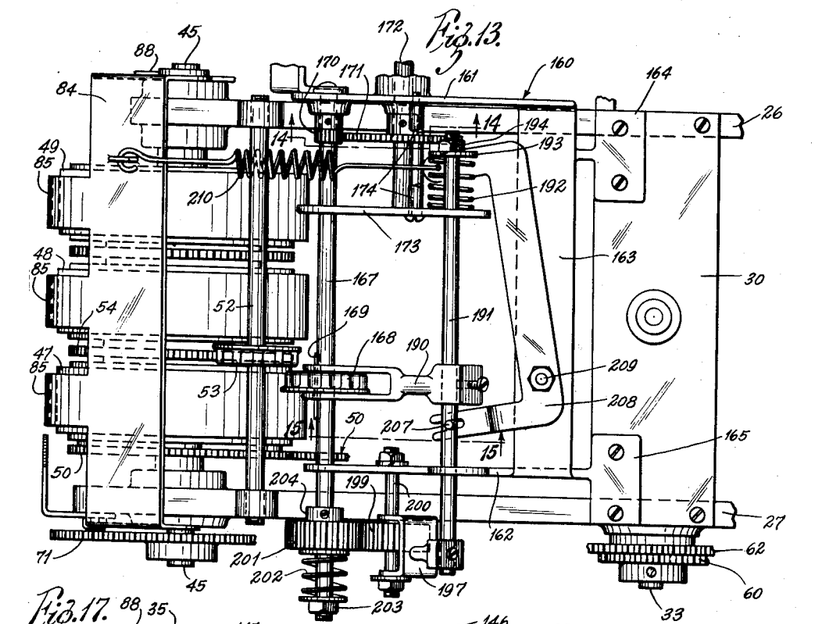
Fig. 13 is an enlarged plan view of part of the mechanism, with certain clutch parts in a position different from that in Fig. 12.

The shaft 191 has a depending pin 207 that is engaged by the forked end of a crank arm 208 pivoted at 209 to the cross member 163 of the bracket 160. The other end of this crank arm 208 is attached to a coil spring 210. The coil spring 210 is normally unloaded. However, when the shield 84 is moved down by the zeroizing mechanism, the spring 210 is expanded and draws the end of the crank arm 208 counterclockwise to the position shown, in which, through the pin 207, it shifts the shaft 191 axially toward the side frame 27 against the spring 192. The fork 190 in this operation disengages the gear 168 from the gear 53, and the fork 190 causes the gear 199 to mesh with the gear 201, and with the idler gear 69, as shown in Fig. 11. By this arrangement, when the zeroizing gears are driven, the idler gear 69 will be rotated. It will thereby cause rotation of the shaft 167 in a backward direction. It will not affect the tally gear 53 because of the fact that the gear 168 is out of mesh therewith. However, the gear 170 will act through the gear 171 to return the wiper arm 176 to its starting position.

The mechanism includes a switchboard, generally indicated at 220, it being attached to the side of the casing 24. It includes a plurality of push buttons 221. Each of these push buttons is individually operatable, and when pushed in will remain in until cleared. It may be cleared by depression of any of the other buttons, as in the familiar radio set construction. It also may be cleared by a button 222 at one end of the switchboard. This button, when depressed, operates the clearing mechanism to return all of the buttons 221 to their open positions. In addition to that, there are two master switch buttons 223 and 224 which are adapted to select either gallons or dollars and cents for the determination of the amount of liquid dispensed. The two switches 223 and 224 are likewise both cleared whenever the button 222 is depressed, but are not cleared by depression of any of the buttons 221. As such clearing mechanism is conventional, it is not here illustrated.

Figure 1:
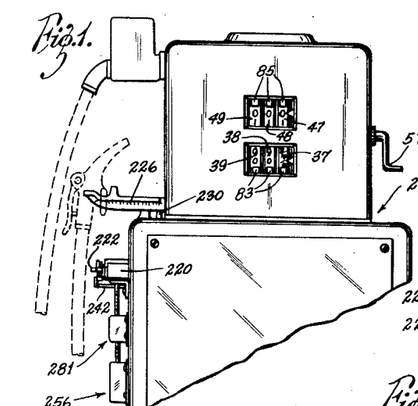
Fig. 1 is an end elevation of a pump having the mechanism of this invention thereon.
Figure 2:
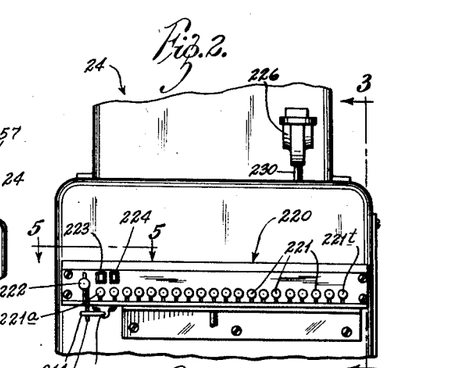
Fig. 2 is a side elevation taken from the left side of Fig. 1, showing the switchboard.
Figures 3, 4:
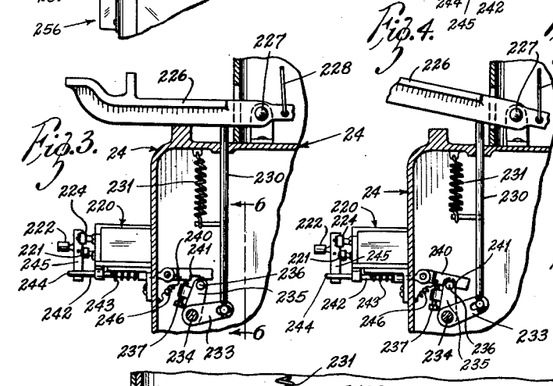
Fig. 3 is an enlarged section on the line 3—3 of Fig. 2 of the clearing mechanism actuated by the nozzle hanging lever, shown in section.
Fig. 4 is a view similar to Fig. 3 with the nozzle hanging lever released.
Figure 5:
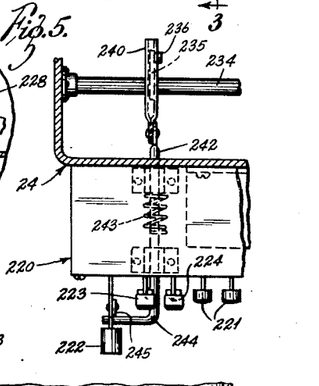
Fig. 5 is a horizontal section on the line 5—5 of Fig. 2, showing the top of certain parts that are also shown in Figs. 3 and 4.

The button 222 may be depressed manually or it may be depressed whenever the operation is completed by some other means. In the case of a gasoline pump, it may be cleared by the operation of hanging the pump nozzle onto the side of the pump. To this end, there is a nozzle receiving lever 226 pivoted at 227 to the casing 24. It carries a link 228 that may be used to operate a master switch, if desired. The lever 226 is adapted to engage a push pin 230 that is normally urged upwardly by a tension spring 231 attached between a pin projecting from the lever 226 and the top of the casing 24, as shown in Fig. 3. The lower end of the pin 230 engages in a pin and slot manner with a crank arm 233 that is fixed to a cross shaft 234 mounted pivotally in the casing. The other end of this cross shaft has an upstanding rocker arm 235 thereon which has a pin 236 projecting to one side of its outer end. There is likewise a setscrew 237 that projects from a lug integral with the side of the rocker arm 235, as shown in Fig. 3.

Figures 6, 7:
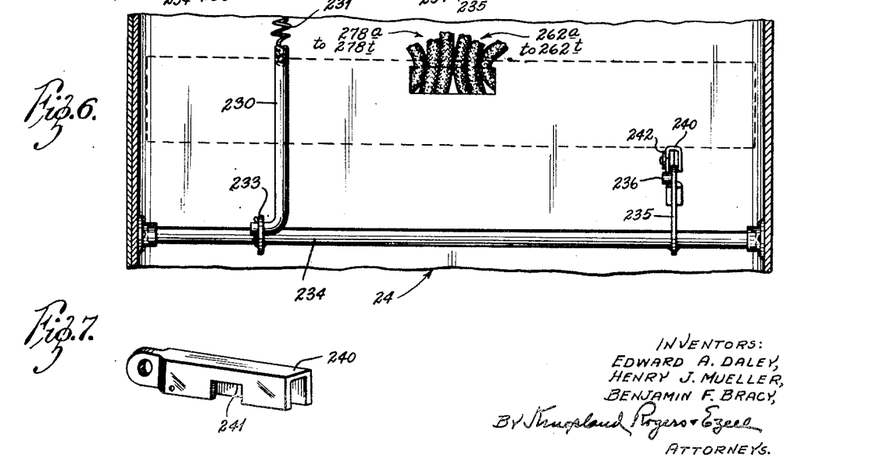
Fig. 6 is a vertical lateral section, on the line 6—6 of Fig. 3, showing the nozzle release rocker shaft.
Fig. 7 is a perspective view of the release latch arm.
Figures 8, 9:
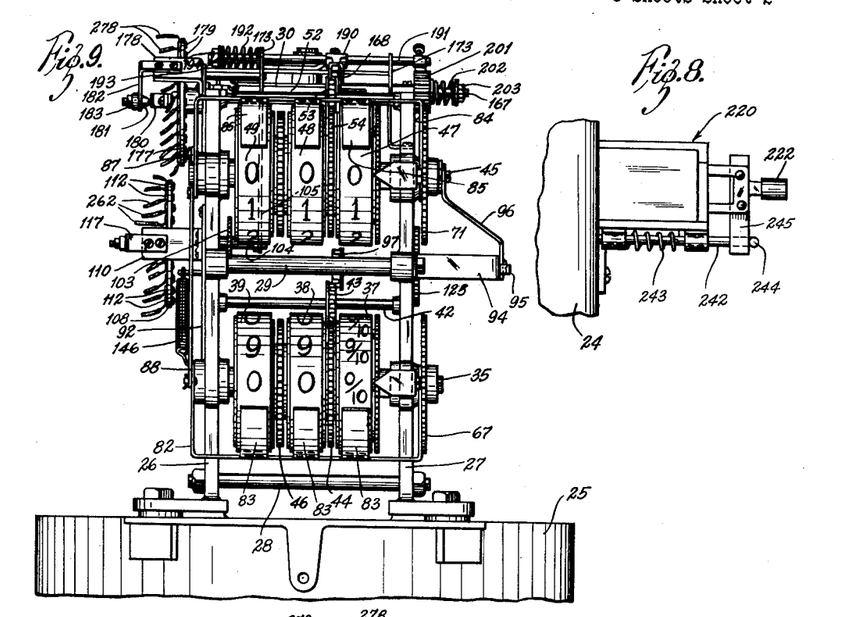
Fig. 8 is an end view of the switchboard mechanism, taken from the end at the left of Fig. 2.
Fig. 9 is a view of the indicator mechanism and parts of the electrical counters similar to their showing in Fig. 1, but with the outside cover and the crank handle removed.

This rocker arm is adapted for engagement in a latch link 240, shown in detail in Fig. 7. The end of the rocker arm 235 fits in the channel of this latch link. The latch link is notched at 241, and this notch is adapted, under certain circumstances, to receive the pin 236. The edge of the latch link is engageable by the adjustable setscrew 237.

The link is pivoted to a slide rod 242, which is urged outwardly, that is, to the left in Fig. 3, by a coil spring 243. This rod 242 has a bent-over end 244 that engages a depending bar 245 associated with the clearing mechanism operated by the button 222.

When the nozzle lever 226 is down, the mechanism assumes the position shown in Fig. 3. When the nozzle is removed, the spring 231 draws the crank arm 233 upwardly, as shown in Fig. 4, which rocks the crank arm 235 counterclockwise so that the button 236 engages in the notch 241. A coil spring 246 causes the link 240 to drop down to the position shown in Fig. 4.

When the nozzle is replaced and the lever 226 is caused to drop downwardly to its initial position, the crank arm 233 is again rocked counterclockwise and the rocker arm 235 follows this movement. However, at this time, the pin 236 is engaged in the notch 241, so that the latching link 240 is drawn to the right in the drawings, which effects a depression of the button 222 and a clearance of all of the switches. As the rocking movement continues, the screw 237 will engage the edge of the latching link 240, after a predetermined adjustable movement of the latch inwardly, so that further rocking movement will cause the latching link to be displaced upwardly and pivoted off of the pin 235. Hence, when the nozzle lever 226 assumes its final resting position, the latching link 240 is again released, and the release button 222 is returned by its spring 243 to its released position.

Figures 19, 20:
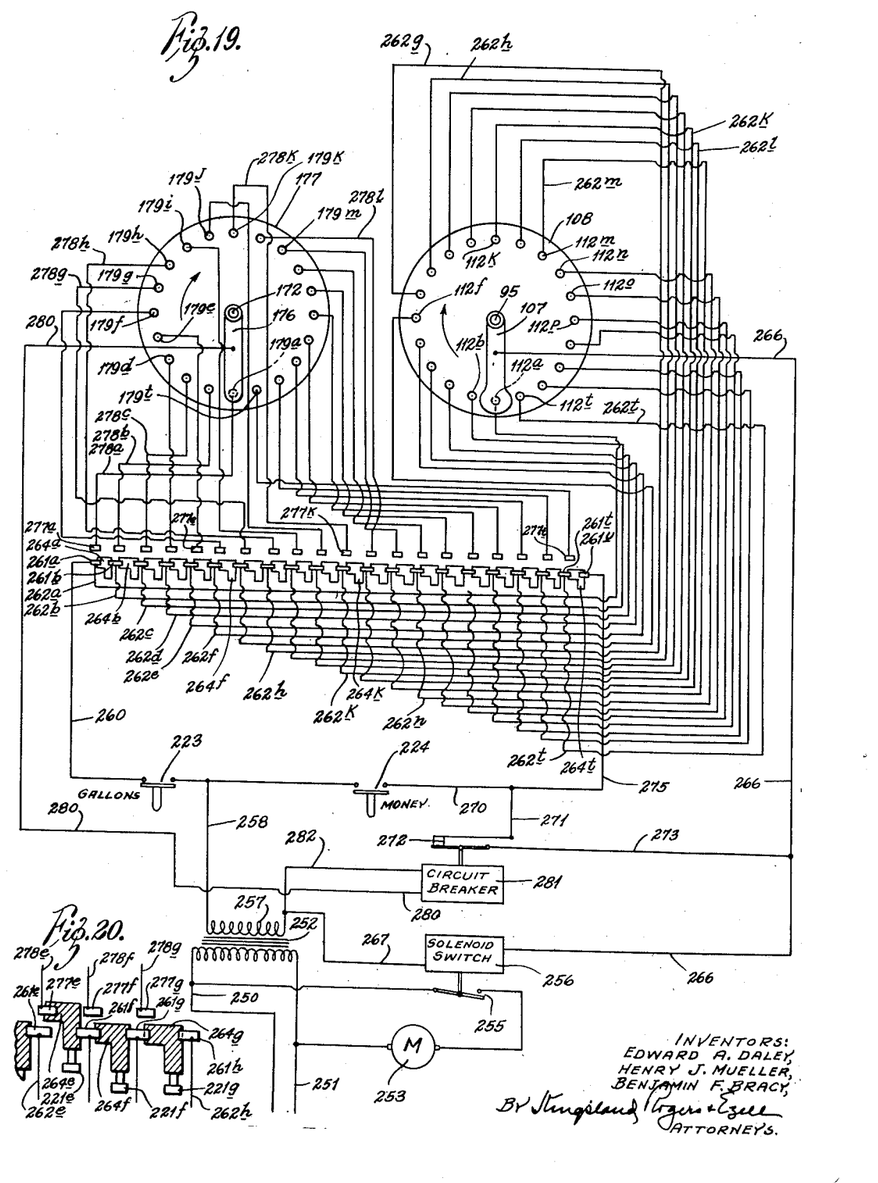
Fig. 19 is a view of the wiring diagram of the electrical connections.
Fig. 20 is an enlarged view of a portion of the switchboard mechanism.

The wiring of the mechanism is shown in Fig. 19 with certain of the switches indicated in Fig. 20. There are shown two power connections 250 and 251 connected across the primary of a transformer 252. A pumping and driving motor 253 is connected across the two power lines. However, its circuit is controlled by a relay switch 255 that is operated by a coil 256. The transformer 252 has a secondary 257. One side 258 of the secondary is connected to one side each of the two master switches 223 and 224.

The switch 223 at its other side is connected by a line 260 with a contact 261 of one of the push button switches. The construction of these switches is shown in Fig. 20. The contacts 261 are designated as 261a, 261b, etc.

Each of the contacts 261a through 261u is connected by a wire with one of the contacts 112 on the disc 108. Thus the contact 261a is connected by a wire 262a with the zero contact button 112a. Likewise, the contact 261b is connected by a wire 262b with the contact 112b, etc. To refer particularly to the contact shown in Fig. 20, the contact 261e is connected by a line 262e with the contact 112e.

The switch buttons 221 are mounted upon contact plates 264 that, when released, engage adjacent the contacts 261. Hence, when all the buttons 221 are released, all of the contacts 261a through 261u are connected together. When any button 221 is depressed, it breaks its two adjacent contacts 261. As shown in Fig. 20, the contact 261e is broken from the contact 261f. This breaks the over-all end-to-end circuit across the switchboard. These buttons are of the type that are normally spring urged outwardly, but, when any is depressed, it is latched in until released by depression of any other one, or depression of the clearing button 222.

The wiper arm 107 is adapted to wipe across the several contacts 112. It is connected by a wire 266 back through the relay coil 256, from which a wire 267 leads back to the other side of the secondary 257.

The foregoing comprises a closed circuit arrangement, which, as will be seen, provides for the dispensing of gallons in the present arrangement. The same switchboard is arranged for the dispensing of amounts of liquid determined in dollars and cents. To this end, the other side of the switch 224 is connected by a line 270 to a line 271 that leads through a normally closed relay switch 272, the other contact of which is connected by a line 273 to the line 266 that leads through the solenoid switch 256.

The line 270 is also connected by a line 275 to the contact 261u, which is at the end of the closed contact series. There are a series of contacts 277a through 277t. Whenever one of the switch buttons 221 is depressed, it breaks from one of the contacts 261 with which it was engaged, and makes with a corresponding back contact 277. Thus, if the button 221e is depressed, to break its switch plate 264e from the contact 261e, it will close the contact plate 264e between the contact 261f and the contact 277e. Also, the contact 261f is connected through the released switch plates 264 with all of the other contacts 261 to the right of it and up to and including the contact 261u.

Each of the contacts 277 is connected by its wire 278 to the contacts 179 on the disc 177. Thus, the contact 277a is connected by the wire 278a to the zero contact button 179a, and the contact 277e is connected by the wire 278e to the contact 179e.

The wiper arm 176 is connected by a line 280 through the coil 281 of the circuit breaker switch 272. The other side of this coil is connected by a line 282 back into the secondary. When the coil 281 is energized, the switch 272 will be opened.

The operation of the electrical parts is as follows:

At the start, the mechanism will be cleared. The nozzle lever 226 will be down, as in Fig. 3, with the lug 236 freed from the notch 241 and the rod 242 released to outward position to which it is driven by the spring 243.

When the customer indicates his requirement in either gallons or money, the operator depresses the appropriate button 221. These buttons are graduated from left to right in both gallon units and ten-cent units, although any other units may be used appropriate to the chosen dispensing operation and material dispensed. If it be assumed that the demand is for five gallons of gasoline, the button 221e is depressed. Then the nozzle is withdrawn from the lever 226 and inserted into the tank. This operation releases the rod 230 to move upwardly under pull of its spring 231, to rock the shaft 234 and the crank arm 235, so that the lug 236 comes under the notch 241 in the latching link 240, which drops to the position of Fig. 4.

Then the operator depresses the button 223, closing its master switch. (The choice of sequence between the button 221, the button 223, and the introduction of the nozzle into the tank is obviously variable, just so the motor 253 is not started before the nozzle is in the tank. In other words, the nozzle must be introduced into the tank before both switch buttons 221 and 223 are pressed.)

The foregoing will close the circuit from the secondary 257 through the line 258, the switch 223, and the line 260 to the first contact 261a. The circuit will then pass through the lead 262a to the zero button 112a, and thence out the line 266 through the solenoid switch coil 256 and the line 267 back to the secondary 257. This will immediately close the switch 255 and start the pump and drive motor 253 to working.

From the previous description of the mechanism, it will be remembered that the pump motor is geared to the counting mechanism and to the wiper arms 107 and 176, which thereby will start wiping over their respective contacts. When the wiper arm 107 leaves the contact 112a and makes with the contact 112b, there will be no change in the circuit because the contact 112b is hot by virtue of the fact that the circuit is completed from the line 260 through the contact 262a, the switch blade 264a, the contact 261b, etc. Thus, the wiper arm may continue to move until it reaches a dead contact 112.

As originally selected, the five-gallon button was depressed. This breaks the blade 264e away from the contact 261e, so that the contact 261f is no longer in circuit. Hence, the wiper arm 107 will continue across the hot contact 261e and its correspondingly hot contact 112e to the dead contact 112f. When it reaches this contact 112f, the circuit will be broken because the secondary line 258 and its continuation 260 will be broken.

Hence the coil 256 will be deenergized, and the switch 255 will drop open, stopping the motor. At this point, five gallons of gasoline will have been delivered.

When the pump nozzle is again hung on the lever 226, this will depress the rod 230, rocking the shaft 234 and the crank arm 235 with its lug 236. This lug, then engaged in the notch 241, draws the link 240 and the rod 242 inwardly, operating the clearing mechanism the same way a manual depression of the button 222 does, releasing the buttons 221 and 223 to outward position. Toward the end of the rocking movement of the arm 235, the screw 237 will lift the link 240 off the lug 236, and the spring 243 will return the rod 242.

At the end of any operation by a pump of this kind, it is necessary to zeroize the mechanism. This is done by rotating the crank 57 one revolution, which rotates the shaft 56 and the cam wheel 75 in a clockwise direction, as it appears in Fig. 10.

The first part of the movement of the shaft 55 and the cam 75 causes the cam follower lug 78 on the bell crank 77 to be emitted from the notch 76 on the cam wheel 75. This causes a rocking of the bell crank 77 in a counterclockwise direction, which, through the link 87, causes the shield 84 to rock clockwise a portion of a revolution, so as to bring the fingers 85 down over the exposed figures on the indicating drums. Likewise, the link 88 causes the shield 82 to be rocked in a counterclockwise direction to do the same thing with the fingers 83 on the lower drums. It will be understood that the shields at the opposite end of the mechanism operate in a similar manner.

When the lower shield 82 is rocked counterclockwise, the normally unloaded coil spring 146 is put under tension. It draws down the end of the bell crank arm 141 (Figs. 17, 18), and thereby slides the slide 135 toward the frame 27. This yoke 135 has positive engagement with the gear 97, and the foregoing motion disengages this gear 97 from the tally gear 43. Likewise, the engagement of the gear 97 with the sleeve 128 causes this sleeve to be displaced axially, which, through the engagement of the disc 129, compresses the spring 126 away from the gear 125 and permits the other spring 126 to cause the gear 125 to follow the movement of the disc 129. The result of this action is to cause meshing of the gear 125 with the zeroizing gear 71, so that the gear 125 is driven with the rotation of the zeroizing gear. It will be understood that the zeroizing gear 71 is driven when the crank 57 is turned. This arrangement causes a return movement of the shaft 95 the same distance that it was moved away from its zero position. The rotation of the shaft 95 reverses through the gears 102 and 103 to return the wiper arm 107 to its zero position. In this operation, any back over-travel of the wiper arms is prevented, as excess rotation of the gear wheel 125 under the action of the gear 71 is merely taken up in slip action of the gear 125 on the shaft 95.

When a complete return revolution of the crank 57 has been made, the spring 79 will cause the bell crank lever 77 to rock to drop the lug 78 back into the notch 76. This will return the shields and will unload the spring 146. Thereupon, the spring 145, which is lighter than the spring 146, will return the shifter fork 135 to its position shown in Fig. 17 wherein the gear 97 is again meshed with the gear 43 and the gear 125 is withdrawn from mesh with the gear 71. The mechanism will then be prepared for a new operation.

If, on the other hand, it is desired to dispense fifty cents' worth of gasoline, the same button 221 may be depressed to break with the contact 261e and to make with the contact 277e.

The operation of the mechanism will be the same, except that the switch 224 is closed instead of the switch 223. This will complete a circuit from the secondary 257 through the line 258, the switch 224, the line 270, the line 271, the closed switch 272, the line 273, the line 266, the solenoid switch coil 256, and the line 267 back to the secondary. This will immediately close the solenoid switch 255 and start the motor, at the same time causing the wiper arm 176 to start rotating clockwise.

The depression of the particular button causes the circuit to be completed from the line 275 through all of the closed contacts 261 to the particular depressed switch blade 264e, which is in contact, as indicated, with the contact 277e. This particular contact 277e is connected by its line 278e with the contact 179e which is thereby hot.

The passage of the wiper arm 176, bringing its contact over the contacts 179 ahead of the contact 179e, will have no effect because all of the other contacts 277 are cold. However, when the wiper arm reaches the contact 179e, which is hot, the circuit will be completed from the contact 179e through the wiper arm to the line 280, and back through the circuit breaker coil 281, and thence by the line 282 to the secondary. This will energize the circuit breaker coil and open the switch 272. When the switch 272 is opened, this deenergizes the solenoid switch coil 256 by breaking its circuit. Hence, the switch 255 will open and the motor will stop. Thereafter, when the attendant again hangs up the nozzle on the lever 226, the switchboard will be entirely cleared.

The calculators and wiper arms may be zeroized by operating the crank 57. This zeroizing operation zeroizes both wiper arms to the required extent at one time. Zeroizing the lower wiper arm 107 has already been described. In addition to that operation, the rocking of the shield 84 loads the spring 210, which draws the end of the lever 208 counterclockwise, as shown in Fig. 13. This lever 208, through the pin 207, displaces the shaft 191 toward the side frame 27 against the action of the spring 192. In this, the fork 190 moves the gear 168 away from the tally gear 53, so that the tally gear may be returned in the zeroizing operation of the drum. Also the fork 197 engages the gear 199 to move it into mesh with the gear 201, so that the gear 199 is thereby caused to drive the gear 201 from the gear 69. It will be noticed that the gear 199 is thicker than the gear 69 so that it remains in mesh with this latter gear despite this displacement. The foregoing operation causes a reverse movement of the shaft 167 which is transmitted through the gears 170 and 171 to the wiper arm 176, which is thereby returned to its starting or zero position in contact with the contact 179a. Over-travel of the shaft 167 under the action of the gears 69 and 199 is prevented by the slip friction engagement of the gear 201 with the shaft 167. Hence, after the wiper arm is returned to its starting position, any further travel of the gear 199 produces no effect. The mechanism is finally released after the complete revolution of the crank arm 57 in the manner aforesaid.

It will be seen that one of the switches 223 or 224 must be closed in order to have any operation at all. It will also be seen that, after a particular button 221 is depressed, the dispensing will be in either gallons or money, in accordance with which of the two switches 223 and 224 is closed. Both cannot be closed at one time because depressing one clears the other in the known manner.

The two wiper arms are geared differently so as to take care of the difference in dispensing units. The wiper arm 176 is geared to run at least as fast as, and preferably faster than, the arm 107 to prevent the existence of parasitic circuits.

For example, if the wiper arm 107 reached the contact 112f, this contact would be hot because of the circuit through the switch 224 and around the closed contacts 221. If the wiper arm 107 reaches this contact 112f before or as soon as the wiper arm 176 reaches the hot contact 179e, stopping the motor, the motor would not stop because thereafter all of the successive contacts 112 are hot.

If the customer, in the middle of an operation, decides to have a different quantity of material that is more than the amount dispensed up to that point, this may be easily provided by depressing an appropriate switch button 221. For example, if, after the dispensing of three gallons on an initial choice of five gallons, the customer desires eight gallons, it is necessary only to depress the appropriate contact 221. Furthermore, if the customer decides upon having two dollars' worth of gasoline, after having initially called for five gallons, this may be done, provided only a lesser amount has already been dispensed, by depressing the appropriate two-dollar button 221 and depressing then the money master switch button 224. The latter automatically clears the switch 223 and the mechanism will proceed to dispense the two dollars' worth of gasoline.

It will be seen that this mechanism provides a dispensing control that has particular value in connection with the sale of gasoline. It will be understood that its principles may be applied to the dispensing of different material than gasoline, and also that the particular units chosen are subject to any variation.

What is claimed is:

1. In a control for liquid dispensers having a power means operating the same, the combination of a pair of members moved in accordance with movement of the power means but at different rates relative thereto, each member having associated therewith a plurality of connection operating means disposed successively in the path of the movable members, selector switch means separately movable and having a plurality of connections with the several connection operating means of the movable members, whereby upon selecting by the selector means particular connection operating means of both movable members may be made effective, means adapted for connection with the power means to start the same and to continue its operation, the movable members being adapted to stop the same when the particular connection operating means selected as aforesaid by the selector means is engaged by the movable member, and switch means to control which movable member shall be operable to effect the stopping.

2. In a control for liquid dispensers having a power means operating the same, the combination of stopping mechanism including a plurality of rotatable contact members adapted to be rotated coordinately with the power means, but at different units of movement per unit of movement of the power means and multiple switch members, one for each contact member and each having a plurality of contacts arranged successively in the path of its rotatable contact member, selector switch means connected to both multiple switch members and operable for rendering particular contacts thereon effective, means adapted to start the power means, connections between the selector switch means and the stopping means adapted to effect stopping of the power means when the particular selected contacts of one of the multiple switch members is reached by its rotatable contact member, and means operable to an operating position for rendering one of said stopping means effective.

3. In a control for liquid dispensers having a power means operating the same, the combination of stopping mechanism including a plurality of rotatable contact members adapted to be rotated coordinately with the power means, but at different units of movement per unit of movement of the power means, and multiple switch members, one for each contact member and each having a plurality of contacts arranged successively in the path of its rotatable contact member, selector switch means connected to both multiple switch members and operable for rendering particular contacts thereon effective, means adapted to start the power means, connections between the selector switch means and the stopping means adapted to effect stopping of the power means when the particular selected contacts of one of the multiple switch members is reached by its rotatable contact member, means operable to an operating position for rendering one of said stopping means effective, the selector means comprising a manual switch mechanism with a plurality of contacts severally connected with the contacts on the multiple switch members, and manual means movable for operating particular contacts for making and breaking any chosen one of said connections, and thereby making and breaking particular circuits through the rotatable contact members.

4. In a control for liquid dispensers having a power means operating the same, the combination of stopping mechanism including a plurality of rotatable contact members adapted to be rotated coordinately with the power means, but at different units of movement per unit of movement of the power means, and multiple switch members, one for each contact member and each having a plurality of contacts arranged successively in the path of its rotatable contact member, selector switch means connected to both multiple switch members and operable for rendering particular contacts thereon effective, means adapted to start the power means, connections between the selector switch means and the stopping means adapted to effect stopping of the power means when the particular selected contacts of one of the multiple switch members is reached by its rotatable contact member, and means operable to an operating position for rendering one of said stopping means effective, the selector means comprising a manual switch mechanism with a plurality of contacts severally connected with the contacts on the multiple switch members, manual means movable for operating particular contacts for making and breaking any chosen one of said connections and thereby making and breaking particular circuits through the rotatable contact members, and a nozzle connection from the dispenser, with holding means for the nozzle, and means operated by engagement of the nozzle thereon to return the engaged switch from operated position.

5. In a control for liquid dispensers having a power means operating the same, the combination of stopping mechanism including a plurality of rotatable contact members adapted to be rotated coordinately with the power means, but at different units of movement per unit of movement of the power means, and multiple switch members, one for each contact member and each having a plurality of contacts arranged successively in the path of its rotatable contact member, selector switch means connected to both multiple switch members and operable for rendering particular contacts thereon effective, means adapted to start the power means, connections between the selector switch means and the stopping means adapted to effect stopping of the power means when the particular selected contacts of one of the multiple switch members is reached by its rotatable contact member, means operable to an operating position for rendering one of said stopping means effective, the selector means comprising a manual switch mechanism with a plurality of contacts severally connected with the contacts on the multiple switch members, manual means movable for operating particular contacts for making and breaking any chosen one of said connections and thereby making and breaking particular circuits through the rotatable contact members, and a nozzle connection from the dispenser, with holding means for the nozzle, means operated by engagement of the nozzle thereon to return the engaged switch from operated position, and connections in said last named means also to return the means for rendering one stopping means effective, from operating position.

6. In a control for liquid dispensers having a power means operating the same, the combination of stopping mechanism including a plurality of rotatable contact members adapted to be rotated coordinately with the power means, but at different units of movement per unit of movement of the power means, and multiple switch members, one for each contact member and each having a plurality of contacts arranged successively in the path of its rotatable contact member, selector switch means connected to both multiple switch members and operable for rendering particular contacts thereon effective, means adapted to start the power means, connections between the selector switch means and the stopping means adapted to effect stopping of the power means when the particular selected contacts of one of the multiple switch members is reached by its rotatable contact member, and means operable to an operating position for rendering one of said stopping means effective, the selector means including a plurality of contacts severally connected with the contacts on one multiple switch member, means to complete a circuit through selected ones of said contacts in series and to break the circuit thereafter, whereby at least one of said rotatable contact members may have an operating circuit for the power means completed through it until the rotatable contact member arrives at a selected contact and thereafter having a circuit broken at the selector means.

7. In a control for liquid dispensers having a power means operating the same, the combination of stopping mechanism including a plurality of rotatable contact members adapted to be rotated coordinately with the power means, but at different units of movement per unit of movement of the power means, and multiple switch members, one for each contact member and each having a plurality of contacts arranged successively in the path of its rotatable contact member, selector switch means connected to both multiple switch members and operable for rendering particular contacts thereon effective, means adapted to start the power means, connections between the selector switch means and the stopping means adapted to effect stopping of the power means when the particular selected contacts of one of the multiple switch members is reached by its rotatable contact member, means operable to an operating position for rendering one of said stopping means effective, the selector means including a plurality of contacts severally connected with the contacts on one multiple switch member, means to complete a circuit through selected ones of said contacts in series and to break the circuit thereafter, whereby at least one of said rotatable contact members may have an operating circuit for the power means completed through it until the rotatable contact member arrives at a selected contact and thereafter having a circuit broken at the selector means, a second set of contacts in the selector means severally connected with the other multiple switch member contacts, the circuit making and breaking means being adapted to close with a selected one of said second set of contacts, whereby a circuit may be made therethrough when the rotatable element thereof closes with said made contact, and means operated through said made contact to stop the power means.

8. In a control for liquid dispensers having a power means operating the same, a pair of wiper arms operated coordinately with the power means but at different rates of movement relative thereto, a pair of contact discs, one for each arm, and each having a plurality of contacts successively arranged in the path of its arm, the contacts on the two discs being spaced so that successive contacts on one disc are engaged by its arm before successive contacts on the other disc are engaged by the arm for such other disc, selector means having a plurality of contacts successively arranged for connection with the successive contacts of the discs, means for operating particular contacts of the selector means to render particular contacts of the discs effective, connections from each wiper arm and disc assembly for controlling operation of the power means, and switch means for closing a selected one of said connections for changing the operation of the power means when the wiper arm of that disc reaches the contact corresponding to the one selected by the selector means.

9. In a control for liquid dispensers having a power means operating the same, a pair of wiper arms operated coordinately with the power means but at different rates of movement relative thereto, a pair of contact discs, one for each arm, and each having a plurality of contacts successively arranged in the path of its arm, the contacts on the two discs being spaced so that successive contacts on one disc are engaged by its arm before successive contacts on the other disc are engaged by the arm for such other disc, selector means having a plurality of contacts successively arranged for connection with the successive contacts of the discs, means for operating particular contacts of the selector means to render particular contacts of the discs effective, connections from each wiper arm and disc assembly for controlling operation of the power means, and switch means for closing a selected one of said connections for changing the operation of the power means when the wiper arm of that disc reaches the contact corresponding to the one selected by the selector means, the operating means for the selector means comprising a set of push buttons.

10. A control for a liquid dispenser having a power means, including a rotatable wiper element connected for rotation with the power means, a disc having a plurality of contacts successively arranged in the path of the wiper element, selector means for rendering a chosen one of said contacts effective, means to start the power means, means including connections between the power means, the selector means and the disc contacts for stopping operation of the power means when the chosen contact is reached by the wiper element, and means to return the wiper element to starting position, including return rotating means, means to render the power means ineffective, means to connect the wiper element to the return means, said connecting means permitting overtravel of the return means after the wiper element has reached its starting position.

11. In a liquid dispenser, a power means, indicating means connected with the power means and movable to indicate the amount as it is being dispensed, control means set in operation at the beginning of the dispensing operation for stopping the power means after a predetermined amount is dispensed, including an element separate from the indicating means moved with the power means, and means under control of said element for causing the power means to stop; means for zeroizing the indicating means and the element in the same operation, the zeroizing means including a moving member, connections between the member and the indicating means, selectively engaging means between the moving member and the element, and means operated by movement of the moving member to operate the selectively engaging means.

12. In a liquid dispenser, a power means, indicating means connected with the power means and movable to indicate the amount as it is being dispensed, control means set in operation at the beginning of the dispensing operation for stopping the power means after a predetermined amount is dispensed, including an element separate from the indicating means moved with the power means, and means under control of said element for causing the power means to stop; means for zeroizing the indicating means and the element in the same operation, the zeroizing means including a moving member, connections between the member and the indicating means, selectively engaging means between the moving member and the element, and means operated by movement of the moving member to operate the selectively engaging means, the selectively engaging means including also means to disconnect the element from movement with the power means.

13. In a mechanism of the kind described, a power means and mechanism to produce a predetermined movement of the power means and then to stop the same, a single selection mechanism having a plurality of switch means adapted to be calibrated in two different units, a pair of operating switching devices each having movable means and a plurality of successive contacts closed by said movable means, each movable means being connected for operation by the power means, one movable means being moved from one contact to a succeeding contact in one increment of movement of the power means, the other movable means being moved between two successive contacts in a different increment of movement of the power means, means to stop the power means, circuit means, one between the switch means of the selection mechanism and each of said succesive contacts, each circuit means including the stopping means, and means to selectively energize each circuit arrangement.

14. In a mechanism of the kind described, selector means including a plurality of selector switch means operable from initial to second positions, said switch means having first contacts closed together in series when all of the switch means are in initial positions, and having second contacts closed with corresponding first contacts when a switch means is shifted to second position, a pair of operating switching devices each including a movable means and a plurality of contacts successively closable thereby, the selector switch means having its first contacts connected in order to one set of operating device contacts, and its second contacts connected to the other set of operating device contacts, a power line connected to opposite ends of the selector switch means in their initial positions, an operated device, a second power line connected to the operated device, a circuit breaker having a switch and energizing means, a connection from the operated device to one movable means, a connection from the second power line through the circuit breaker energizing means and the other movable means, a connection from one end of the selector switch means through the circuit breaker switch and the actuated device, and selectively operatable switch means to open and close the lines leading to opposite ends of the selector switch means.

15. In a control for liquid dispensers having a power means operating the same, the combination of a pair of members moved in accordance with movement of the power means but at different rates relative thereto, each member having associated therewith a plurality of connection operating means disposed successively in the path of the movable members, selector switch means separately movable and having a plurality of connections with the several connection operating means of the movable members, whereby upon selecting by the selector means particular connection operating means of both movable members may be made effective, means adapted for connection with the power means to start the same and to continue its operation, the movable members being adapted to stop the same when the particular connection operating means selected as aforesaid by the selector means is engaged by the movable member, switch means to control which movable member shall be operable to effect the stopping, indicating means connected with the power means and movable to indicate the amount as it is being dispensed, means for returning the indicating means and said movable members to their starting positions in the same operation including a moving element, connections between said element and the indicating means, selectively engaging means between said element and said movable members, and means operated by movement of said element to operate the selectively engaging means, the selectively engaging means including also means to disconnect the movable member from movement with the power means.

16. In a control for liquid dispensers having a power means operating the same, a pair of wiper arms operated coordinately with the power means but at different rates of movement relative thereto, a pair of contact discs, one for each arm, and each having a plurality of contacts successively arranged in the path of its arm, the contacts on the two discs being spaced so that successive contacts on one disc are engaged by its arm before successive contacts on the other disc are engaged by the arm for such other disc, selector means having a plurality of contacts successively arranged for connection with the successive contacts of the discs, means for operating particular contacts of the selector means to render particular contacts of the discs effective, connections from each wiper arm and disc assembly for controlling operation of the power means, switch means for closing a selected one of said connections for changing the operation of the power means when the wiper arm of that disc reaches the contact corresponding to the one selected by the selector means, indicating means connected with the power means and movable to indicate the amount as it is being dispensed, means for returning the indicating means and said wiper arms to their starting positions in the same operation including a moving element, connections between said element and the indicating means, selectively engaging means between said element and said wiper arms, and means operated by movement of said element to operate the selectively engaging means, the selectively engaging means including also means to disconnect the wiper arms from movement with the power means.

EDWARD A. DALEY.
HENRY J. MUELLER.
BENJAMIN F. BRACY.

References Cited in the file of this patent

UNITED STATES PATENTS

| Number | Name | Date |
|---|---|---|
| 1,607,899 | Long | Nov. 23, 1926 |
| 2,116,785 | Griffith | May 10, 1938 |
| 2,227,830 | Hazard | Jan. 7, 1941 |
| 2,305,221 | Managan | Dec. 15, 1942 |
| 2,358,712 | Hinds | Sept. 19, 1944 |